United States Patent [19]

Claycomb

[11] 4,224,687
[45] Sep. 23, 1980

[54] PRESSURE PULSE DETECTION APPARATUS INCORPORATING NOISE REDUCTION FEATURE

[76] Inventor: Jack R. Claycomb, 8226 Waynemer, Houston, Tex. 77040

[21] Appl. No.: 31,078

[22] Filed: Apr. 18, 1979

[51] Int. Cl.$^2$ .............................................. E21B 47/06
[52] U.S. Cl. ..................................................... 367/83
[58] Field of Search .................... 73/151, 212; 175/40, 175/50; 367/83

[56] References Cited

U.S. PATENT DOCUMENTS

| | | | |
|---|---|---|---|
| 2,898,088 | 8/1959 | Alder | 73/151 |
| 2,924,432 | 2/1960 | Arps et al. | 73/151 |

*Primary Examiner*—Jerry W. Myracle
*Attorney, Agent, or Firm*—Donald Gunn

[57] ABSTRACT

An improved apparatus is disclosed for use in a measuring while drilling apparatus which forms a pressure pulse promulgated from a downhole location upwardly through the drill string and column of mud therein. This apparatus includes a mud line section adapted to flow drilling mud in the mud flow line through an axial passage therein. The apparatus includes an encircling bladder which receives hydraulic oil under pressure to inflate to choke the passage. A Pitot tube is focused downstream and thus does not intercept the mud flow from the pump and the noise which is created by pump operation. Mud pressure variations directed upstream from the measuring while drilling apparatus, however, are directed into the Pitot tube. These pressure variations are coupled to a pressure signal transducer which forms an output signal of some type which is recorded. Pump noise is nulled to a minimum.

10 Claims, 1 Drawing Figure

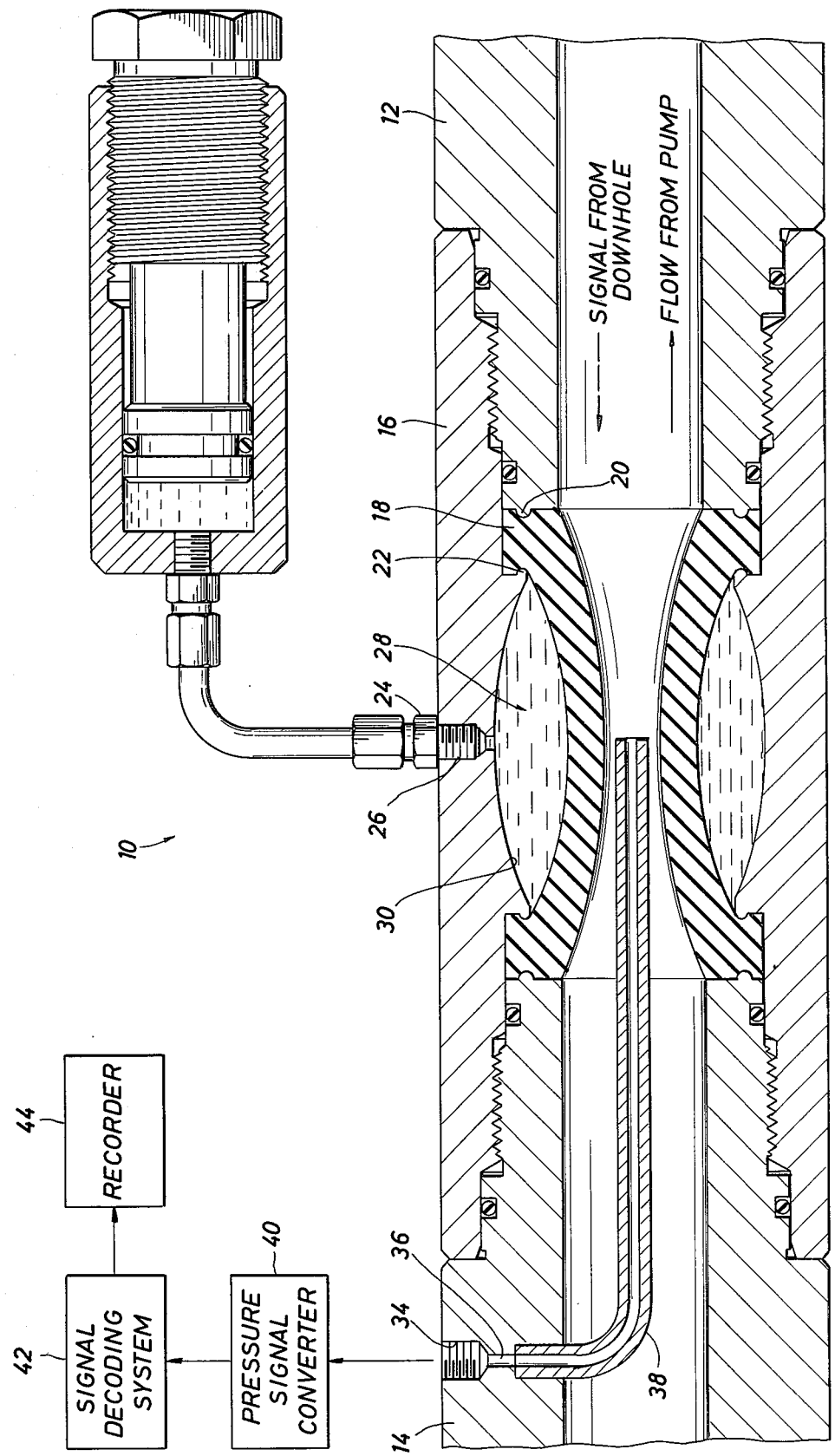

PRESSURE PULSE DETECTION APPARATUS INCORPORATING NOISE REDUCTION FEATURE

BACKGROUND OF THE DISCLOSURE

In drilling an oil well, a drill string having a drill bit affixed to the bottom is customarily used. The drill string is connected into a mud flow system which typically utilizes drilling mud which is pumped by a multiple cylinder pump. The pump connects through a mud line to the top of the drill string, and the mud is delivered under pressure to the top of the drill string for flowing through the drill string to the drill bit. The pump typically operates at high pressures, and pressures in the range of 2,000 to 3,000 psi at the pump discharge outlet are not uncommon. Typical pumps are multiple cylinder pumps. During the operation of the pumps, there are pressure surges in the range of 200 to 300 psi which are caused by power strokes of individual pistons within the pump. These pressure surges are quite large, especially at the surface where there is a minimum of pressure surge damping in the mud delivery system.

Measuring while drilling apparatus has been known heretofore. Such equipment typically operates by forming variable constrictions in the drill string. This forms a pressure pulse transferred through the standing column of mud in the drill string back to the surface. As an example, a constriction might be formed by the measuring while drilling apparatus which signal is then coupled through 10,000 feet of mud standing as a column within the drill pipe. While the mud might be deemed to be an incompressible fluid, nevertheless, the signal received at the surface from the downhole equipment is relatively small. It is relatively small, smaller than the pump surges found at the surface. The pressure pulses or variations at the surface are large; they can be ten to one hundred times greater than the variable data from the measuring while drilling apparatus.

In the operation of measuring while drilling apparatus, pressure pulses travel through the mud at a velocity equal to the acoustic velocity of the medium. Depending on the makeup of the drilling mud, this is a velocity of about 4,000 to 5,000 feet per second. Moreover, each pressure pulse is accompanied by a change in fluid velocity which is defined by the relationship quantifying the water hammer effect. The pressure change-velocity change relationship is therefore given by the following equation:

$$\Delta P = R_0 C \Delta V \quad (6)$$

where $\Delta P$ = the magnitude of the pressure pulse,
$R_0$ = the fluid mass density,
$C$ = the acoustic velocity in the fluid, and
$\Delta V$ = the change in fluid velocity.

As will be understood from the foregoing equation, pressure pulses formed by measuring while drilling apparatus are related to fluid velocity changes in the foregoing equation.

A typical mud pump forms a pressure surge during the power stroke of the individual pistons in it. This represents a positive pressure surge. This increases the mud flow velocity in the drill string. Conversely, pressure pulses from measuring while drilling apparatus located downhole decrease the mud flow velocity as a result of propogation in the opposite direction. Taking into account the direction of propogation in the system, there is, therefore, an interesting relationship. For a given pressure surge originating with the pump and moving downstream in the same direction as the mud flow, there is a positive pressure increase and a related velocity increase. Conversely, where the pressure pulse is originated at the downhole equipment and moves upstream against the flow of mud, a pulse originating at measuring while drilling apparatus and propogated upstream against the flow of mud is accompanied by a decrease in velocity of mud in the drill string. Intuitively, this conforms to the observation that measuring while drilling apparatus which momentarily constricts the mud flow to form a pressure pulse also retards the mud flow velocity.

This is a linear phenomena, and, thus, pulses traveling in both directions add algebraically. Pressure and velocity variations are thus cumulative.

BRIEF DESCRIPTION OF THE DISCLOSURE

With this background information in mind, the present invention is able to obtain measurements from downhole operation which are protected from noise. The present invention, therefore, incorporates a Pitot tube which is pointed downstream in the drilling mud and which is, therefore, shielded against pressure surges from the mud pump. Moreover, the apparatus can be tuned or adjusted by modifying the cross-sectional area obtained by positioning a rubber, or flexible, tubular diaphragm in the mud flow path. A closed hydraulic system on the exterior of the diaphragm is included. As pressure in the hydraulic system is increased, the diaphragm expands, thereby constricting the axial passage.

BRIEF DESCRIPTION OF THE DRAWINGS

The single drawing discloses the pressure pulse detector apparatus of the present invention installed in a mud line which is shown in sectional view and further includes an output apparatus for converting pressure variations into signals of a suitable form.

DETAILED DESCRIPTION OF THE ILLUSTRATED EMBODIMENT

Attention is first directed to the only drawing, where the present invention is identified generally by the numeral 10 and is referred to hereafter as a pressure pulse detection system. The detection system 10 is installed in a mud line preferably at some point between the mud pump at the surface and the kelly attached to the top end of the drill string. The particular location is not critical; it is best installed above the kelly, as, for example, at the top end of the mud hose or adjacent to the goose neck. In any case, the apparatus includes an API standard pipe 12 for ease of connection. Another API standard pipe 14 is arranged oppositely of the pipe 12. These two are connected together by means of a coupling 16 which includes typical or standard API threads, seals and the like. Needless to say, details and thread arrangement can be varied. The coupling 16 contains the equipment of the present invention. In particular, the equipment is symmetrical at the top and bottom ends, and they jointly capture or enclose a diaphragm member 18. The diaphragm is concentric about its axis and is also symmetrical as viewed in the single drawing. The diaphragm is a hollow, tube-shaped member and is pinched between a rib 20 on the pipe 12 and a similar rib 22 mounted on the coupling 16. The ribs 20 and 22 clamp one end portion of the diaphragm. It will be observed that the diaphragm is formed with an elongate, hollow, tubular body, and a protruding, circular flange is located at the end of it. This clamps the diaphragm so that it is held firmly at each end. The central portions are free to flex and expand.

The coupling 16 functions primarily as pipe couplings at the ends, but the central portions comprise a part of the hydraulic chamber. A fitting 24 is threaded into a tapped opening 26 to introduce hydraulic oil under pressure into a chamber 28. The chamber 28 receives oil under pressure, being on the interior of the coupling 16 and on the exterior of the rubber diaphragm 18. The coupling 16 thus has a curved surface at 30 which defines the chamber 28 and limits the length of the chamber where hydraulic fluid is received. It will be observed that the diaphragm 18 is formed in the shape of a sleeve, fully surrounding the axial passage through the equipment. The diaphragm 18, when exposed to reduce pressure, will shrink and thereby increase the diameter of the axial passage through it. This depends on the pressure balance which is achieved between the pressure of the mud flowing through the drill string and the pressure of the hydraulic fluid. This pressure balance will be described in detail hereinafter.

An illustrated, manually operated cylinder or pump supplies hydraulic fluid under pressure to the diaphragm to expand it. The pipe 14 incorporates a tapped opening 34 which, in turn, opens to a passage 36 which is counterbored with an enlarged, drilled hole to receive a Pitot tube 38 pointing downstream. Mud flow through the equipment is from the left to the right of the single drawing. In other words, the mud flow is from an upstream location past the opening of the Pitot tube. The opening at the Pitot tube points downstream toward the measuring while drilling apparatus; it does not point upstream toward the mud pump. Accordingly, there is some shielding of mud pump pressure surges. By means of a suitable fluid line, the mud in the Pitot tube is coupled to a pressure signal converter 40. A typical transducer can be used such as a strain gauge pressure transducer. An alternate construction is quartz or other piezoelectric crystals. In any case, the pressure is converted into a specified form of output signal such as a signal as formed by a piezoelectric crystal. This signal is then supplied to a decoding apparatus 42 which, in turn, then supplies the pressure information in electrical form to a strip chart recorder 44. The recorder 44 records, as a function of time, the pressure which is sensed by the apparatus.

The term "noise" refers to a surge coupled through the Pitot tube from above; a signal is from below, and, yet, both have the same physical form, namely, a surge at the output of the Pitot tube.

The foregoing describes the layout of the equipment. Its operation requires further elaboration. For a given Pitot tube, there is a stagnation pressure defined by known texts. The stagnation pressure is variant from the system pressure as given by the following equation:

$$P_s = P_0 + KV_0^2 \tag{2}$$

where $P_s$ = the stagnation pressure,
$P_0$ = the system pressure,
$K$ = a constant, and
$V_0$ = the fluid velocity.
In the foregoing equation, the second term is positive or negative dependent on the direction in which the Pitot tube is pointed. The constant is typically measured by empirical observations and is not readily predicted by calculation or theory. This is in accordance with the text, *Fluid Mechanics*, by Daugherty and Ingersoll, 1954, at page 107.

A further fact is that the diaphragm 18 functions as a venturi. There is a known relationship in which the velocity and pressure of a fluid flowing through a venturi varies, and a steady state solution for that is given by the Bernoulli equation. Another relationship of interest is the continuity equation which relates the velocities and areas, the equation being:

$$V_1 A_1 = V_2 A_2 \tag{3}$$

where $V_1$ = the velocity through the cross-sectional area $A_1$, and
$V_2$ = the velocity through the cross-sectional area $A_2$.
Accordingly, utilizing the continuity equation, the water hammer equation first given above and the Bernoulli equation, some understanding of the system's operation can be obtained. A pressure pulse from the pump passes the end of the Pitot tube moving in the downstream direction. The Pitot tube output signal is increased by the pressure sensed by the Pitot tube. Simultaneously, however, it is decreased by the velocity rise associated with the pressure surge. In other words, the pressure surge forms an increasing output signal from the Pitot tube. The increase in velocity forms a smaller Pitot tube output signal. The size of the venturi is thus adjusted so that the pressure and velocity variations become equal, and, being opposite of one another, they tend to cancel. The venturi throat is thus adjusted until pump pressure surges from the mud pump form no output changes. As an example, if the normal quiescent pressure is 2,500 psi and the pump surges are 250 psi above the norm, the surges can be nulled through adjustments of the venturi throat.

Conversely, when a signal from downhole travels up the mud column, the signal is definitely smaller than the pressure pump surges. The smaller signal is directed upstream and passes into the end of the Pitot tube. There is a consequential increase in fluid pressure and a decrease in fluid velocity in the venturi throat. It will be recalled, however, that the venturi has been previously adjusted so that pressure and velocity variations of a pulse are of equal magnitude. This pulse, however, is traveling up the mud column, not down the mud column as is the case when the pulse is generated at the mud pump.

With pulses propogating up the mud column, the separate variations resulting from pressure and velocity alterations are additive. As a consequence, the Pitot tube output signal is twice as large as a result of this reinforcement. This serves as a signal enhancement for the very small signals which are received from downhole. By way of background, it was observed earlier that they must propogate as much as 10,000 feet or more through a column of mud. Moreover, they are not originated by the multi-thousand horsepower type of source which characterizes the mud pump, itself; rather, they are formed or created by momentary constrictions in the drill string, itself.

The enhanced output signals are then handled through the additional apparatus which is shown in the single drawing. The signal detector can be any of the apparatus such as illustrated in U.S. Pat. Nos. 3,309,656, 3,488,629, 3,555,504, 3,716,830 and 3,747,059, all of which are incorporated by reference herein.

A typical pattern for downhole pulses might be the following sequence:

(a) A first pulse of five seconds duration serving as a calibration pulse;

(b) A second pulse allocated at five seconds duration per forty-five degrees of heading, representing a maximum pulse length of forty seconds;

(c) A third pulse where five seconds represents fifteen degrees of inclination for a maximum of thirty seconds;

(d) Another pulse for orientation, typically scaled to five seconds representing a forty-five degree sector and a maximum of forty seconds;

(e) A fifth or last pulse serving as a calibration pulse of some arbitrary length such as fifteen seconds.

From the foregoing, it will be observed that the present invention is able to null pressure pump variations. Pumps sometimes develop their own signatures; that is to say, a first piston may form a pressure variation of twelve percent (12%) of the base, while the second piston might form a nine percent (9%) variation. The present invention at a given quiescent pressure is reasonably linear and, therefore, able to null a range of pressure variations and, consequently, provide a suitable output signal devoid of noise peaks.

While the foregoing is directed to the preferred embodiment, the scope is determined by the claims which follow.

I claim:

1. Apparatus for use in detecting signals conveyed up a column of drilling mud in a drill string from a downhole signal source wherein the apparatus is subjected to noise from an upstream source such as a noisy mud pump, which apparatus is adapted to be connected in the mud flow path at a selected location and which apparatus comprises:

(a) a Pitot tube with an open end positioned in the mud flow path and pointed downstream; and (b) a serially connected venturi positioned about the Pitot tube adjacent to the open end thereof and further including a means for altering the throat of said venturi adjacent to the open end of said Pitot tube.

2. The apparatus of claim 1 wherein said venturi means comprises an elongate, resilient, expandable and shrinkable diaphragm installed in an elongate pipe coupling, which pipe coupling includes a fluid receiving chamber around said diaphragm, which chamber is adapted to receive fluid under pressure which, on variation of pressure, causes said diaphragm to expand or shrink to thereby vary the opening in said venturi.

3. The apparatus of claim 2 wherein said pipe coupling includes first and second end portions which are threaded for connection to cooperative pipes in the mud flow path.

4. The apparatus of claim 1 including pressure signal transducer means connected to said Pitot tube for forming an output electrical signal from an input pressure variation signal.

5. The apparatus of claim 1 including means for supplying fluid under pressure to said venturi for altering the throat area of said venturi.

6. A method of detecting downstream pressure pulses from measuring while drilling equipment affixed near the lower portions of a drill string, which equipment forms signals traveling up the mud column in the drill string and which signals are obscured by pulses from noise sources elsewhere in the mud column which are propogated downstream, the method of the present invention comprising the steps of:

(a) positioning a Pitot tube having the open end pointed downstream in the mud column;

(b) positioning an adjustable venturi around the open end of the Pitot tube;

(c) adjusting the throat diameter of the venturi to null pressure surges propogated from upstream so that they form a minimal output signal at the output of said Pitot tube; and (d) receiving pressure pulses propogated through the column of mud which are detected by the Pitot tube which forms an output signal representative of pressure pulses traveling upstream.

7. The method of claim 6 including the step of adjusting the throat of said venturi by applying fluid under pressure on the outside of a resilient tubular member functioning as said venturi, which pressure variations alter the diameter of said throat.

8. The method of claim 7 wherein the pressure is adjusted to thereby adjust the diameter of the venturi throat and wherein such adjustments are made until pressure pulses propogated from upstream to downstream are nulled to zero at the output of the Pitot tube.

9. The method of claim 6 including the step of sensing pressure signals at the output of the Pitot tube.

10. Apparatus for use in detecting signals conveyed up a column of drilling mud in a drill string from a downhole signal source wherein the apparatus is subjected to noise from an upstream source such as a noisy mud pump, which apparatus is adapted to be connected in the mud flow path at a selected location and which apparatus comprises:

(a) a Pitot tube with an open end positioned in the mud flow path and pointed downstream; and (b) an axially located venturi having a throat of reduced diameter compared with the end diameter and surrounding said Pitot tube wherein the diameter is reduced from the end diameter in relation to the mud flow velocity and pressure at said venturi.

* * * * *